(12) United States Patent
Van Stam

(10) Patent No.: US 9,866,920 B2
(45) Date of Patent: Jan. 9, 2018

(54) INTELLIGENT PEER-TO-PEER SYSTEM AND METHOD FOR COLLABORATIVE SUGGESTIONS AND PROPAGATION OF MEDIA

(71) Applicant: TiVo Solutions Inc., San Carlos, CA (US)

(72) Inventor: Wijnand J. Van Stam, Sunnyvale, CA (US)

(73) Assignee: TiVo Solutions Inc., San Carlos, CA (US)

( * ) Notice: Subject to any disclaimer, the term of this patent is extended or adjusted under 35 U.S.C. 154(b) by 0 days.

(21) Appl. No.: 14/716,363

(22) Filed: May 19, 2015

(65) Prior Publication Data

US 2015/0256897 A1 Sep. 10, 2015

Related U.S. Application Data

(63) Continuation of application No. 13/244,476, filed on Sep. 25, 2011, now Pat. No. 9,055,197, which is a
(Continued)

(51) Int. Cl.
*H04N 7/173* (2011.01)
*H04N 7/10* (2006.01)
(Continued)

(52) U.S. Cl.
CPC ..... *H04N 21/632* (2013.01); *G06F 17/30029* (2013.01); *G06F 17/30035* (2013.01);
(Continued)

(58) Field of Classification Search
CPC .... H04N 21/25; H04N 21/45; H04N 21/4668; H04N 21/4756
(Continued)

(56) References Cited

U.S. PATENT DOCUMENTS 5,758,259 A 5/1998 Lawler
5,790,935 A 8/1998 Payton
(Continued)

OTHER PUBLICATIONS

U.S. Appl. No. 12/946,815, filed Nov. 15, 2010 Notice of Allowance, dated Jan. 14, 2013.
(Continued)

*Primary Examiner* — James R Sheleheda
*Assistant Examiner* — Franklin Andramuno
(74) *Attorney, Agent, or Firm* — Haley Guilliano LLP

(57) ABSTRACT

In a network-based system for recommending media content items based on user preferences, clients contact a server on a periodic basis, independent of the user. In addition to client-server interaction, clients also interact with one another in peer-to-peer fashion. Peers query one another and evaluate their similarity to each other in an interactive comparison of user preferences. When two clients are sufficiently similar, the interaction culminates in the originating client downloading content listings from the targeted peer to generate suggestions for their user. If the two clients are dissimilar, the query may be terminated, or the targeted peer may route the query to a second targeted peer. In addition to the lists of preferences, the originating client may download actual content items from the targeted peers.

18 Claims, 2 Drawing Sheets

Related U.S. Application Data continuation of application No. 10/168,782, filed as application No. PCT/US00/35035 on Dec. 21, 2000, now Pat. No. 8,132,219.

(60) Provisional application No. 60/171,829, filed on Dec. 21, 1999, provisional application No. 60/226,856, filed on Aug. 22, 2000.

(51) Int. Cl.

| | |
|---|---|
| *H04N 5/445* | (2011.01) |
| *H04N 21/63* | (2011.01) |
| *H04H 60/35* | (2008.01) |
| *H04N 21/442* | (2011.01) |
| *G06F 17/30* | (2006.01) |
| *G11B 27/10* | (2006.01) |
| *H04N 5/76* | (2006.01) |
| *H04N 5/782* | (2006.01) |
| *H04N 21/258* | (2011.01) |
| *H04N 21/4147* | (2011.01) |
| *H04N 21/443* | (2011.01) |
| *H04N 21/454* | (2011.01) |
| *H04N 21/466* | (2011.01) |
| *H04N 21/482* | (2011.01) |
| *H04N 21/485* | (2011.01) |
| *H04N 21/6543* | (2011.01) |
| *H04N 21/81* | (2011.01) |
| *H04L 29/08* | (2006.01) |
| *H04N 21/25* | (2011.01) |
| *H04N 21/45* | (2011.01) |
| *H04N 21/475* | (2011.01) |
| *G11B 27/34* | (2006.01) |
| *H04N 21/431* | (2011.01) |
| *H04N 21/47* | (2011.01) |

(52) U.S. Cl.
CPC .. *G06F 17/30206* (2013.01); *G06F 17/30699* (2013.01); *G11B 27/105* (2013.01); *H04H 60/35* (2013.01); *H04L 67/10* (2013.01); *H04N 5/44513* (2013.01); *H04N 5/44543* (2013.01); *H04N 5/76* (2013.01); *H04N 5/782* (2013.01); *H04N 7/17318* (2013.01); *H04N 7/17336* (2013.01); *H04N 21/252* (2013.01); *H04N 21/25891* (2013.01); *H04N 21/4147* (2013.01); *H04N 21/442* (2013.01); *H04N 21/443* (2013.01); *H04N 21/44222* (2013.01); *H04N 21/454* (2013.01); *H04N 21/4532* (2013.01); *H04N 21/466* (2013.01); *H04N 21/4663* (2013.01); *H04N 21/4668* (2013.01); *H04N 21/485* (2013.01); *H04N 21/4826* (2013.01); *H04N 21/4828* (2013.01); *H04N 21/6543* (2013.01); *H04N 21/812* (2013.01); *G11B 27/34* (2013.01); *G11B 2220/20* (2013.01); *H04N 21/25* (2013.01); *H04N 21/4316* (2013.01); *H04N 21/45* (2013.01); *H04N 21/47* (2013.01); *H04N 21/4756* (2013.01)

(58) Field of Classification Search
USPC .............................. 725/105, 46, 32
See application file for complete search history.

(56) References Cited

U.S. PATENT DOCUMENTS

| | | | | |
|---|---|---|---|---|
| 5,812,293 | A * | 9/1998 | Yen | G08C 17/00 341/176 |
| 5,828,843 | A * | 10/1998 | Grimm | G06F 9/5027 463/42 |
| 5,835,087 | A | 11/1998 | Herz et al. | |
| 5,867,799 | A | 2/1999 | Lang et al. | |
| 5,884,282 | A * | 3/1999 | Robinson | G06F 17/30699 705/12 |
| 5,973,683 | A | 10/1999 | Cragun et al. | |
| 5,983,214 | A | 11/1999 | Lang et al. | |
| 6,005,597 | A | 12/1999 | Barrett et al. | |
| 6,061,650 | A | 5/2000 | Malkin et al. | |
| 6,088,722 | A | 7/2000 | Herz et al. | |
| 6,092,049 | A | 7/2000 | Chislenko et al. | |
| 6,148,142 | A * | 11/2000 | Anderson | G06F 3/0601 348/E5.008 |
| 6,177,931 | B1 | 1/2001 | Alexander et al. | |
| 6,249,785 | B1 | 6/2001 | Paepke | |
| 6,266,649 | B1 | 7/2001 | Linden et al. | |
| 6,317,881 | B1 | 11/2001 | Shah-Nazaroff et al. | |
| 6,438,579 | B1 | 8/2002 | Hosken | |
| 6,457,010 | B1 | 9/2002 | Eldering et al. | |
| 6,460,036 | B1 | 10/2002 | Herz | |
| 6,526,577 | B1 | 2/2003 | Knudson et al. | |
| 6,606,624 | B1 | 8/2003 | Goldberg | |
| 6,675,205 | B2 | 1/2004 | Meadway et al. | |
| 6,685,479 | B1 * | 2/2004 | Ghaly | G09B 19/00 434/236 |
| 6,813,775 | B1 | 11/2004 | Finseth et al. | |
| 7,065,709 | B2 | 6/2006 | Ellis et al. | |
| 7,146,627 | B1 | 12/2006 | Ismail et al. | |
| 9,055,197 | B2 | 6/2015 | Van Stam | |
| 2003/0110503 | A1 | 6/2003 | Perkes | |
| 2004/0117831 | A1 | 6/2004 | Ellis et al. | |
| 2005/0027810 | A1 | 2/2005 | Donovan | |
| 2005/0262542 | A1 | 11/2005 | DeWeese et al. | |
| 2005/0267994 | A1 * | 12/2005 | Wong | H04N 5/765 709/246 |
| 2006/0190966 | A1 | 8/2006 | McKissick et al. | |
| 2012/0016934 | A1 | 1/2012 | Van Stam | |
| 2012/0084818 | A1 | 4/2012 | Ali et al. | |

OTHER PUBLICATIONS

U.S. Appl. No. 13/244,476, filed Sep. 25, 2011, Final Office Action, dated Jan. 24, 2014.
U.S. Appl. No. 13/894,299, filed May 14, 2013, Final Office Action, dated Jun. 11, 2014.
U.S. Appl. No. 13/244,476, filed Sep. 25, 2011, Office Action, dated Jul. 8, 2014.
U.S. Appl. No. 10/168,782, filed Jun. 21, 2002, Notice of Allowance, dated Jul. 20, 2011.
U.S. Appl. No. 10/168,782, filed Jun. 21, 2002, Office Action, dated Mar. 28, 2007.
U.S. Appl. No. 10/168,782, filed Jun. 21, 2002, Advisory Action, dated Nov. 28, 2007.
U.S. Appl. No. 10/168,782, filed Jun. 21, 2002, Office Action, dated Aug. 18, 2010.
U.S. Appl. No. 10/168,782, filed Jun. 21, 2002, Office Action, dated Aug. 23, 2007.
U.S. Appl. No. 10/168,782, filed Jun. 21, 2002, Office Action, dated Apr. 1, 2008.
U.S. Appl. No. 10/168,782, filed Jun. 21, 2002, Office Action, dated Sep. 2, 2008.
U.S. Appl. No. 10/168,782, filed Jun. 21, 2002, Office Action, dated Aug. 19, 2009.
U.S. Appl. No. 10/168,782, filed Jun. 21, 2002, Office Action, dated Feb. 4, 2010.
U.S. Appl. No. 10/168,782, filed Jun. 21, 2002, Office Action, dated Jan. 12, 2009.
U.S. Appl. No. 10/168,782, filed Jun. 21, 2002, dated Jun. 21, 2002.
U.S., U.S. Appl. No. 13/894,299, Final Office Action dated Jun. 11, 2014.
U.S., U.S. Appl. No. 13/894,299, Advisory Action dated Dec. 1, 2014.
U.S., U.S. Appl. No. 13/244,476, Notice of Allowance dated Feb. 9, 2015.

(56) References Cited

OTHER PUBLICATIONS

U.S., U.S. Appl. No. 13/894,299, Non-Final Office Action dated Feb. 11, 2015.

* cited by examiner

INTELLIGENT PEER-TO-PEER SYSTEM AND METHOD FOR COLLABORATIVE SUGGESTIONS AND PROPAGATION OF MEDIA

CROSS-REFERENCE TO RELATED APPLICATIONS; BENEFIT CLAIM

This application claims benefit as a Continuation of application Ser. No. 13/244,476, filed Sep. 25, 2011, which claims benefit as a Continuation of application Ser. No. 10/168,782, filed Jun. 21, 2002, which claims benefit under 35 U.S.C. §371 as a National Stage Entry of International Application PCT/US00/35035, filed Dec. 21, 2000, which claims priority to provisional application No. 60/171,829 filed Dec. 21, 1999 and provisional application No. 60/226,856 filed Aug. 22, 2000, to which provisional applications this application further claims benefit under 35 U.S.C. §119(e). The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Field of the Invention

The present invention relates to automated systems and methods for recommending items to users. More particularly, the invention relates to an automated peer-to-peer system and method for collaborative suggestions and propagation of media.

2. Description of Related Art

The prior art provides various systems for filtering, suggesting and rating of media content items. Common methods of suggesting and rating items occasionally employ collaborative filtering techniques, in which a user's preference profile is compared with profiles of similar users or groups of users. The co-pending application, K. Ali, W. Van Stam, "Intelligent system and methods of recommending media content items based on user preferences," PCT Patent Application No. PCT/US00/33876 (Dec. 14, 2000) discusses several of these collaborative filtering implementations. In addition, J. Atcheson, J. Miller, "Method and apparatus for recommending selections based on preferences in a multi-user system," U.S. Pat. No. 5,583,763 (Dec. 10, 1996) describe a system for determining selections that a user is likely to be interested in. A determination is made, based on a user's prior indicated preferences, designated in a preferences list. The list is compared with other users' lists. When a large number of matches is found between two lists, the unmatched entries of the other user's list are extracted. Typically, these implementations require a client-server network environment and a stateful connection between the client and the server. Correlations are calculated on the server, based on data periodically supplied by the client, necessitating monitoring of the client state, thereby raising confidentiality concerns. It would be desirable to provide a collaborative suggestion system in which a stateful connection between client and server is unnecessary, thus reducing concerns about user privacy.

The above-identified co-pending application, K. Ali, et al., supra, describes a distributed collaborative filtering engine that guarantees user privacy by eliminating the necessity of correlating the user to other user's or groups of users. Similarity is calculated on the client side, eliminating the necessity of a stateful connection between the server and the client. The described system, however, employs a client-server architecture in which information is exchanged only between client and server. It would be an advantage to provide a system for collaborative suggestion in a peer-to-peer environment, which makes opportunistic use of an existing network connection, wherein peers evaluate their similarity to one another.

Peer-to-peer file sharing systems are becoming increasingly common. For example, the "Gnutella Support Pages," http://gnutella.wego.com (no date) describe a peer-to-peer network composed of a multiplicity of Gnutella clients, in which the client software includes an integrated search engine and file server. The Gnutella network changes constantly, according to the number of Gnutella clients that are on the network at any given time. No server exists, and the network infrastructure is provided by a publicly accessible network, such as the Internet. In order to access the Gnutella network, a user must have the network address of at least one other Gnutella client that is currently connected. A user in search of a particular information object, a digital music file, or a recipe, for example, may send a query over the network. The query is passed from client to client until the object is located or the query is terminated. While the Gnutella client allows the creation of a dynamic peer-to-peer network, and sharing of files between clients, the query process is user-initiated: queries are formulated and launched by the user with no automation of the query process. Additionally, the Gnutella network is primarily directed to file sharing, in which media content items are shared or propagated between users. There is no capability of comparing user profiles between clients in order to generate collaborative suggestions. Furthermore, the Gnutella network is concerned exclusively with the peer-to-peer network paradigm.

It would be a technological advance to provide a system for collaborative suggestions and media propagation that did not require a stateful connection between a client and server, thus safeguarding privacy of individual users. It would be a great advantage to implement such a system as a peer-to-peer based system that was capable of operating in parallel with client-server based suggestion systems, opportunistically employing the same network connection, wherein suggestions generated by both systems are presented in the same software interface. Furthermore, it would be desirable to automate the peer-to-peer system, so that clients could initiate and carry out interactions with each other without direction or intervention by a user.

SUMMARY OF THE INVENTION

A network-based intelligent system for predicting ratings for items of media content according to how likely they are to appeal to a user provides a parallel, peer-to-peer system and method for collaborative suggestions and propagation of media. Using a typical client-server architecture, clients contact a server on a periodic basis, independent of the user. In addition to client-server interaction, clients also make opportunistic use of the network connection to interact with one another in peer-to-peer fashion. The server organizes clients into groups and provides each client within a group with the network address of all other clients in the group. An originating client queries a targeted peer by transmitting a list indicative of its user's preferences. The targeted peer evaluates the similarity of the transmitted list with a list of its own. If the two clients are sufficiently similar, the comparison continues in an interactive fashion. After the initial determination by the targeted peer, the exchange of information proceeds in a stepwise manner, with the originating client evaluating similarity at each stage. If the two clients are dissimilar, either the originating client or the targeted peer may terminate the query, depending on the stage of the interaction; or the targeted peer may route the query to a second targeted peer. The interaction culminates in the originating client downloading content listings from the targeted peer to generate suggestions for their user. In addition to the lists of preferences, the originating client may download actual content items from the targeted peers.

DETAILED DESCRIPTION

Figure 1:
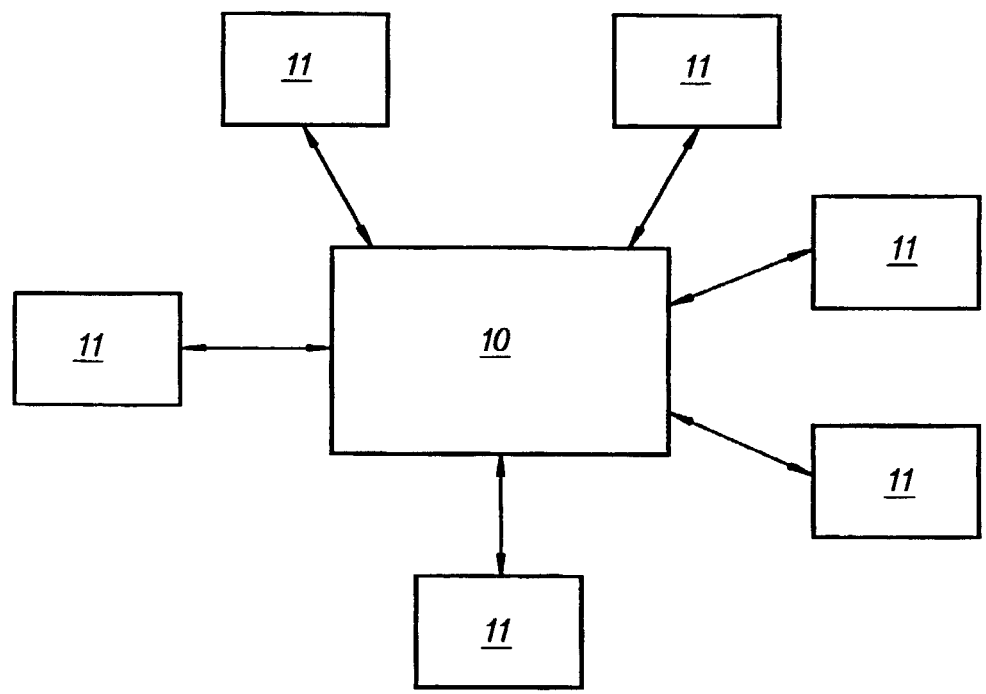
FIG. 1 provides a block diagram of a network-based video recording system, according to the invention.
Figure 2:
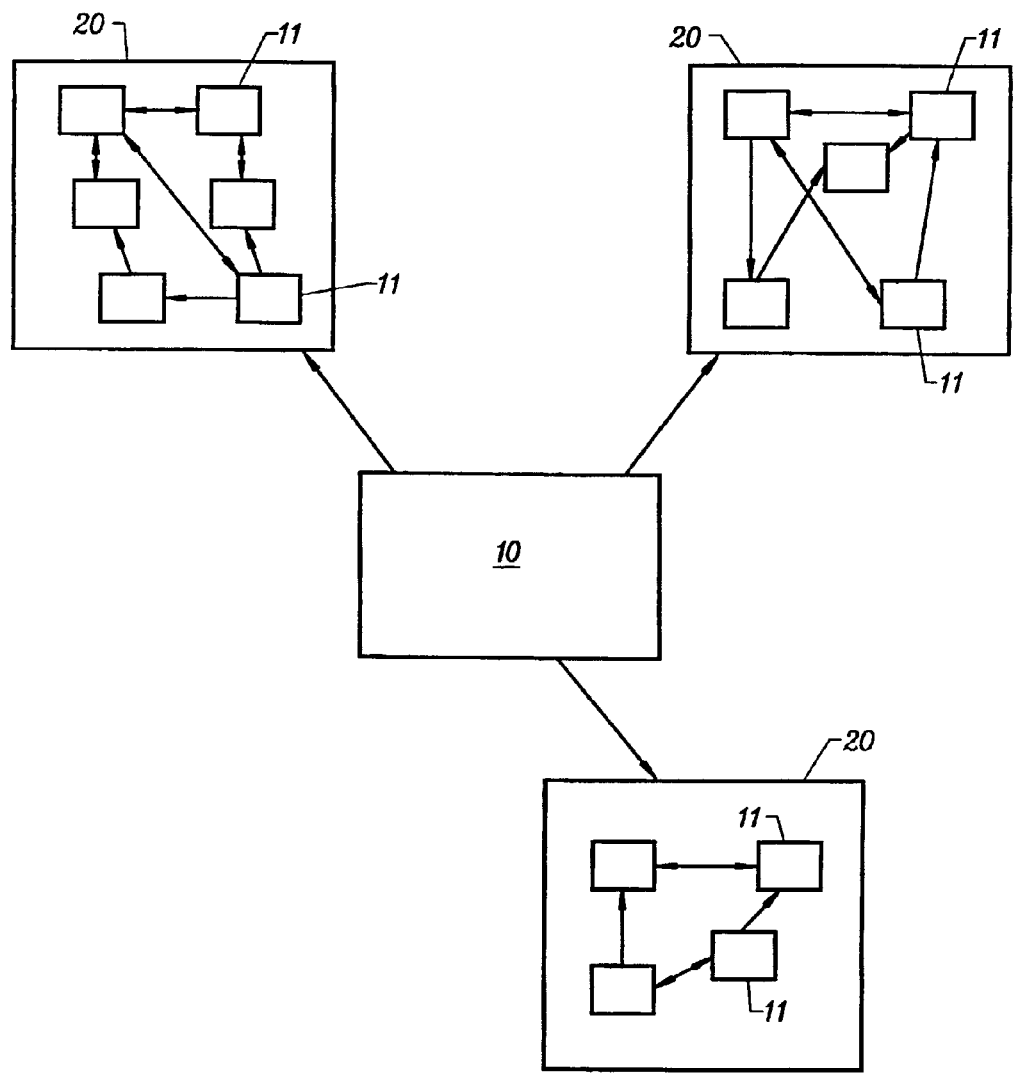
FIG. 2 provides a block diagram illustrating peer-to-peer interaction among the clients of the system of FIG. 1, according to the invention.

The co-pending application, K. Ali, et al., supra, provides an intelligent, distributed system for recommending items of content to a user, based on the user's expressed preferences. The described system, shown here in FIG. 1, employs a client-server network architecture in which each of a plurality of clients is periodically in contact with the server. In the described system, all interaction occurs between the client 11 and the server 10, as FIG. 1 shows. However, the current invention extends the suggestion generating capability of the previous system by making opportunistic use of the network connection to provide peer-to-peer interaction among the clients, so that the knowledge embodied on each of the clients is further leveraged by exchanging suggestions and content directly between clients, in peer-to-peer fashion. In the parallel peer-to-peer system, shown in FIG. 2, the server 10 is operative to organize simultaneously connected clients 11 into one or more groups 20, whereupon the server provides each client within a group 20 the network address of all other clients in the same group. Beyond this initial function, all interaction occurs among the clients, independently of the server, in parallel with the client-server interaction. In the system of the parent application, the client is in contact with the server for a short period of time to download current program guide data and to exchange data with the server for the purpose of generating collaborative suggestions. Since the time of connection varies from day-to-day, in a large community of users, the selection of clients connected to the network at any given time is apt to be fairly random, so that, over time, each client is randomly exposed to a large population of other clients, thereby enabling a rich exchange of information.

While the preferred embodiment of the invention employs the Internet as its network infrastructure, other publicly accessible telecommunications networks would also be suitable: for example, a cable television network. The presently preferred embodiment of the invention employs a dial up network connection. However, hardwired connections, for example, coaxial or fiber optic cable would also be suitable, particularly in the case of broadband implementations of the invention. Furthermore, wireless connections would also be consistent with the spirit and scope of the invention. The type of media involved is highly variable. While the present embodiment of the invention is concerned primarily with various types of television programming, the invention also finds application with text files, web sites, books, digital music; in short, almost any type of digital media.

Communication occurs directly between the clients, in a manner that is difficult to trace or monitor. Furthermore, network addresses are dynamically assigned, and are valid only for the duration of the connection. Thus, the temporary and anonymous nature of the peer-to-peer interaction provides an important safeguard to user privacy.

During their interaction, two clients go through an interactive comparison procedure, in which they compare information that is highly indicative of their respective user's interests. At each step of the procedure, correlation, or similarity is calculated. If the correlations converge, the originating client may request user preference lists from the target peer. If such a convergence isn't reached or the correlation is deemed too low, then the query can be terminated or relayed to a second targeted peer. Various embodiments of the method of interaction between peers are described below.

Peer-to-Peer Suggestion System

In the invented system, a pool of client devices is simultaneously connected to a network. The presently preferred embodiment of the invention incorporates clients of a distributed personal video recording system, in which every client is a dedicated video recording unit. Resident on every client are several lists that are highly indicative of a user's preferences. Minimally, the lists include:

Lists of recorded items that are currently available for viewing;

Lists of various types of items to record (single programs, series, programs of a particular subject or type, programs having a particular actor, and so on); and Lists of rated items.

I. Peer-to-Peer Interconnection

As previously indicated, clients connect to a central server periodically. In a larger community of users, there is a constant group of clients connected to the server, dynamic in nature, in which clients constantly come and go.

The server organizes clients by connection time, so that clients that have connected recently are all placed in the same group; additionally, the server controls group size. A larger group size is preferable in order to maximize the opportunity for interaction among clients. The server provides each client in the group network with network addresses to all other clients in the group. Following group formation, each client is free to contact any other client in the group directly.

II. Peer-to-Peer Interaction

The lists mentioned above may be hundreds or even thousands of items in length. Thus, exchanging an entire list or set of lists between clients may be impractical, particularly in the case of a narrowband dial up network connection. Therefore, a variety of methods have been provided to facilitate peer-to-peer interaction in a manner that economizes on time and network resources.

Method 1: Small Lists Having Dense Meaning.

Each client has one or more compact lists of items that are highly representative of the user's preferences. These may be the list of series to record, or the list of items currently available. Each of them armed with such a list, an originating client (A) and targeted client (B) interact as follows:

Client A sends a query to B, consisting of the list, and the size of the other lists it has to exchange.

Client B receives the query and compares A's list with its own corresponding list to determine the number of elements it shares in the list with client A. It now computes the similarity between A and B, according to an algorithm, resident on both A and B, in which:

Similarity=Number of elements in common between A and B/number of elements reported by A. Similarity is expressed as a value in a range of approximately 0 to 1. Client B may respond in one of several ways:

If the similarity value is less than a first predetermined threshold, it can respond to A that B has nothing that A might be interested in.

If the similarity value exceeds the predetermined threshold, B can respond that A should be interested in B. In addition, B sends more information with the response that indicates relative sizes of B's lists, compared to A's. For example, B might say "Yes, you are 80% interested in me, and I have twice the number of ratings data that you have, and a third your size of recording history". Client A's response is described further below.

If the similarity value is less than the predetermined threshold, B may pass the query from A to a second targeted peer. Upon redirecting, a reference to B is appended to the query so that successive peers know not to pass the query to B. It also allows A to know which clients have evaluated its query when it receives a response. In any further queries originated by A, it will then skip over those that have already been queried.

If Client A receives a positive response from a targeted peer, comprising similarity values, relative list sizes and a listing of peers that have evaluated the query, further interaction is determined by A. If A determines that the similarity value is less than a second predetermined threshold, A terminates the query. Having terminated the query, A may direct additional queries to other clients within the group that have not yet been queried. If the similarity value exceeds the second threshold, client A evaluates which lists it wants to retrieve from the responding peers. If the relative size of any of the other lists is sufficient, A may request the complete list from the responding peer. For example, A may request a full recording history from one respondent and a complete list of ratings from another. Upon receiving the lists, A further evaluates the lists for correlation, and uses them to generate collaborative suggestions for the user. Appropriate methods for computing correlation and generating collaborative suggestions are described in the copending application previously mentioned, K. Ali, et al., supra.

Method 2: Iterative Disclosure.

The previous method assumed that sending a full list of items can be done in small packets that travel easily over the connecting network. When the lists are large, like the recording history, or the ratings list, this method is inefficient. An alternate approach is the sharing of the lists in successive blocks, in iterative fashion. In the following description, as above, Client A is the originator and Client B is the target:

Client A takes a block that includes the first n consecutive items in it's list and transmits it to B.

B receives the list and determines matching items; and transmits a list of matching items to A.

A creates a temporary matching items list, where it saves the list received from B, and transmits another block of n items to B. B responds with another list of matching items, which A adds to its temporary list. With each succeeding response from B, A evaluates what portion of the total number of items shared with B the two peers have in common. When enough items have been tested by repeating the above steps, the ratio remains relatively constant from one iteration to the next. At that point, the similarity value for the partial data is representative of the similarity value for the entire list. The query then proceeds as described above, in which A requests from the target the lists it wishes to receive.

Method 3: Iterative Disclosure of Ratings

Similar to the previous method:

Again, A Sends partial lists to B, and B echoes back what it has. Meanwhile A and B keep track of what they share. In addition, the lists that A sends to B contain A's ratings of the items, and B's answers contain B's ratings of the items matching items. Thus, both A and B maintain a list of items, with both A's and B's ratings. This allows A and B to use standard correlation math to determine how well A and B. As the size of the list of items they have in common grows, the correlation factors will tend to mirror the real correlation factor that would be obtained if all available data was known to both A and B.

According to a minimum confidence requirement standard (based on the number of items shared from A, and number of items that are shared) the process is repeated until the standard is satisfied. After that, A and B can determine if the correlation is high enough to proceed with sharing full lists or to terminate the connection, in the event of an insufficient correlation.

Those skilled in the art will recognize that the roles of originator and target have been employed for purposes of description. In actual fact, each client within a group is both an originator and a target, wherein each client directs queries to other clients and receives queries from other clients. Furthermore, while the client-server system of the copending application and the present peer-to-peer system have been treated as parallel systems for the sake of description, the skilled practitioner will appreciate that they are, in fact, one system having parallel functionalities. Thus, the client units interact with the server in the usual client-server fashion, and simultaneously also have the peer-to-peer functionality herein described. The invention is implemented using conventional techniques well known to those skilled in the art of software engineering and computer programming. The network implementation will be apparent to those skilled in the design and administration of data networks.

While a narrow band dial up connection renders the transmission between clients of large media files impractical, broadband implementations of the invention, wherein connection is by means of fiber optic or coaxial cable, DSL, T1 or T3, or the like, enable the peer-to-peer sharing of the underlying content, as well as the user preference files.

Although the invention has been described herein with reference to certain preferred embodiments, one skilled in the art will readily appreciate that other applications may be substituted without departing from the spirit and scope of the present invention. Accordingly, the invention should only be limited by the Claims included below.

EXAMPLE EMBODIMENTS

Example embodiments are, without limitation, set forth in the following numbered clauses.

1. A peer-to-peer system for collaborative suggestions and media propagation comprising: a network, said network comprising a plurality of clients and at least one server; one or more lists for each client indicative of interests of a corresponding user; means for estimating similarity between said clients, based on said lists; and means for automatically querying one client by another; so that similar clients may share information; wherein said peer-to-peer system operates in parallel with a client-sever system, making opportunistic use of an existing network connection.

2. The system of Clause 1, wherein each of said clients is periodically in contact with said server, and wherein at least a portion of said clients are simultaneously in contact with said server.

3. The system of Clause 2, wherein said server organizes said clients simultaneously in contact with said server into one or more groups, and wherein said means for automatically querying one client by another comprises a network address for each client, wherein said server transmits the network address for each client within a group to all other clients within said group, so that clients within a group may query each other directly.

4. The system of Clause 3, wherein said one or more lists include at least one of: a list of items of media content stored on the respective client; a list of items desired by said user; and a list of items rated by said user.

5. The system of Clause 4, wherein an originating client queries a first targeted peer within said group, and wherein said originating client transmits a list of items indicative of said user's interests.

6. The system of Clause 5, wherein said means for estimating similarity between said clients comprises an algorithm, said algorithm residing on each of said clients, and wherein said targeted peer compares said transmitted list with a list of its own and estimates similarity between the two lists according to said algorithm, said similarity expressed as a value.

7. The system of Clause 6, wherein said algorithm includes the steps of: determining the number of items common to both abbreviated lists; and dividing the number of common items by the total number of items on the list from the originating client, wherein said value results.

8. The system of Clause 7, wherein said value is in a range of approximately 0 to 1.

9. The system of Clause 6, wherein the targeted peer responds by any of: for a similarity estimate falling below a predetermined threshold value, said targeted peer returns said query without providing additional information, while adding a reference to said query so that said originating client doesn't direct further queries to said first targeted peer; for a similarity estimate falling below said predetermined threshold value, said first targeted peer redirects said query to a second targeted peer, wherein said first targeted peer adds a reference to said query so that subsequent peers receiving the query don't redirect the query to the first targeted peer, and so that said originating client has a record of peers already queried; and for a similarity estimate equaling or exceeding said predetermined threshold value, said first targeted peer responds to said originating client by transmitting the similarity estimate along with sizes of complete lists relative to complete list sizes on said originating client.

10. The system of Clause 9, wherein said originating client evaluates similarity estimates, and relative list sizes received from responding targeted peers and responds by any of: terminating said query; directing said query to peers that have not yet been queried; requesting one or more lists from one or more of said responding targeted peers.

11. The system of Clause 10, wherein said originating client evaluates lists received from said responding targeted peers and utilizes unique items from said lists to generate suggestions and recommendations for said user.

12. The system of Clause 11, wherein said originating client requests items of media content from said responding peers, based on contents of said lists.

13. The system of Clause 11, wherein said lists are transmitted in discrete packets.

14. The system of Clause 5, wherein said originating client iteratively queries said targeted peer, wherein an abbreviated list is transmitted with each query, said abbreviated lists comprising successive blocks of n consecutive entries from a complete list.

15. The system of Clause 14, wherein said targeted peer iteratively evaluates each abbreviated list received for items common to both originating client and targeted peer and transmits a list of said common items to said originating client.

16. The system of Clause 15, wherein said originating client evaluates said lists of common items received from said targeted peer and estimates similarity for the corresponding abbreviated list, and wherein an average of said similarity estimates constitutes an estimate of similarity between said originating client and said targeted peer.

17. The system of Clause 16, wherein said lists exchanged between said originating client and said targeted peer also include user ratings for each item, and wherein a correlation is calculated for each abbreviated list based on said user ratings.

18. The system of Clause 17, wherein correlations derived from said abbreviated lists converges, as the number of common items grows, to an actual correlation that would be obtained if all available data from said originating server and said targeted peer were known.

19. The system of Clause 18, wherein said iterative queries continue until confidence in said calculated correlation equals or exceeds a minimum confidence level, based on total number of items shared from said originating server and total number of common items.

20. The system of Clause 19, wherein said originating client: terminates said query based on said calculated correlation; or requests one or more complete lists from said targeted client, based on said calculated correlation.

21. The system of Clause 1, wherein said system is a component of a network-based personal video recording system.

22. A peer-to-peer method of generating collaborative suggestions and propagating items of media content comprising the steps of: providing a network, said network comprising a plurality of clients and at least one server; providing one or more lists for each client indicative of interests of a corresponding user; estimating similarity between said clients, based on said lists; and automatically querying one client by another; so that similar clients may share information, wherein said peer-to-peer method executes in parallel with a client-server method, opportunistically using an existing network connection.

23. The method of Clause 22, wherein each of said clients is periodically in contact with said server, and wherein at least a portion of said clients are simultaneously in contact with said server.

24. The method of Clause 22, further comprising the steps of: organizing said clients simultaneously in contact with said server into one or more groups; and transmitting a network address for each client within a group to all other clients within said group by said server, so that clients within a group may query each other directly.

25. The method of Clause 24, wherein said one or more lists include at least one of: a list of items of media content stored on the respective client; a list of items desired by said user; and a list of items rated by said user.

26. The method of Clause 24, wherein said step of automatically querying one client by another comprises: querying a first targeted peer within said group by an originating client, wherein said originating client transmits a list of items indicative of said user's interests.

27. The method of Clause 26, wherein said step of estimating similarity between said clients comprises the steps of: comparing said transmitted list with a corresponding list of its own by said targeted peer; and estimating similarity between the two lists according to an algorithm, said algorithm residing on each of said clients, said similarity expressed as a value.

28. The method of Clause 27, wherein said algorithm includes the steps of: determining the number of items common to both lists; and dividing the number of common items by the total number of items on the abbreviated list from the originating client, wherein said value results.

29. The method of Clause 28, wherein said value is in a range of approximately 0 to 1.

30. The method of Clause 28, further comprising any of the steps of: for a similarity estimate falling below a predetermined threshold value, returning said query by said first targeted peer without providing additional information, while adding a reference to said query so that said originating client doesn't direct further queries to said first targeted peer; for a similarity estimate falling below said predetermined threshold value, redirecting said query by said first targeted peer to a second targeted peer, wherein said first targeted peer adds a reference to said query so that subsequent peers receiving the query don't redirect the query to the first targeted peer, and so that said originating client has a record of peers already queried; and for a similarity estimate equaling or exceeding said threshold minimum value, responding to said originating client by said first targeted peer by transmitting the similarity estimate along with sizes of complete lists relative to complete list sizes on said originating client.

31. The method of Clause 30, further comprising the step of: evaluating similarity estimates and relative list sizes, by said originating client, received from responding targeted peers 32. The method of Clause 31, further comprising one of the steps of: terminating said query by said originating client; directing said query to peers that have not yet been queried; and requesting one or more lists from one or more of said responding targeted peers.

33. The method of Clause 32 further comprising the step of: utilizing unique items from said lists to generate suggestions and recommendations for said user by said originating client.

34. The method of Clause 32, further comprising the step of: by said originating client, requesting items of media content from said responding peers, based on contents of said lists.

35. The method of Clause 32, wherein said lists are transmitted in discrete packets.

36. The method of Clause 24, wherein said step of automatically querying one client by another comprises: an originating client iteratively querying a targeted peer, wherein an abbreviated list is transmitted with each query, said abbreviated lists comprising consecutive blocks of n consecutive entries from a complete list, starting at a beginning of said complete list.

37. The method of Clause 36, further comprising the steps of said targeted peer iteratively evaluating each abbreviated list received for items common to both originating client and targeted peer; and transmitting a list of said common items to said originating client.

38. The method of Clause 37, wherein said step of estimating similarity between clients comprises the steps of: said originating client evaluating said lists of common items received from said targeted peer; and estimating similarity for the corresponding abbreviated list, wherein an average of said similarity estimates constitutes an estimate of similarity between said originating client and said targeted peer.

39. The method of Clause 38, further comprising the step of: calculating a correlation for each abbreviated list based on user ratings for each item, wherein said lists exchanged between said originating client and said targeted peer also include said user ratings.

40. The method of Clause 39, wherein correlations derived from said abbreviated lists converge, as the number of common items grows, to an actual correlation that would be obtained if all available data from said originating server and said targeted peer were known.

41. The system of Clause 39, wherein said iterative queries continue until confidence in said calculated correlation equals or exceeds a minimum confidence level, based on total number of items shared from said originating server and total number of common items.

42. The method of Clause 41, further comprising one of the steps of: said originating client terminating said query based on said calculated correlation; and said originating client requesting one or more complete lists from said targeted client, based on said calculated correlation.

What is claimed is:

1. A method comprising:
comparing first preference data of a first user of a first client device with second preference data of a second user of a second client device, the first client device and the second client device each being user-operated video devices configured to store and play media contents;
generating a similarity value, based on the comparing of the first preference data with the second preference data, the similarity value indicating a number of common preferences between the first preference data and the second preference data;
determining whether the similarity value is greater or equal to a similarity threshold;
in response to determining that the similarity value is not greater or equal to the similarity threshold, transmitting the second preference data to a third user of a third client device;
in response to determining that the similarity value is greater or equal to the similarity threshold:
identifying one or more suggested media items for the second client device based on the comparison; and
responsive to identifying the one or more suggested media items, causing the first client device to send to the second client device playable contents of the one or more suggested media items;
wherein the method is performed by one or more computing devices.

2. The method of claim 1, wherein the first client device and the second client device are different video recording devices.

3. The method of claim 1, further comprising the second client device requesting to download the one or more suggested media items from the first client device.

4. The method of claim 1, further comprising:
determining whether the first client device is similar to the second client device;
upon determining that the first client device is similar to the second client device, identifying the one or more suggested media items.

5. The method of claim 1, wherein the comparing, identifying, and causing are performed by one or both of the first client device and the second client device.

6. The method of claim 1, further comprising:
the first client device and the second client device receiving grouping data from a central server identifying client devices in a group of client devices;
wherein the comparing, identifying, and causing are performed in response to determining, based on the grouping data, that the first client device and the second client device are in the group of client devices.

7. A system comprising:
a first subsystem, implemented at least partially by hardware, configured to perform comparing first preference data of a first user of a first client device with second preference data of a second user of a second client device, the first client device and the second client device each being user-operated video devices configured to store and play media contents;
a second subsystem, implemented at least partially by hardware, configured to generate a similarity value, based on the comparing of the first preference data with the second preference data, the similarity value indicating a number of common preferences between the first preference data and the second preference data;
a third subsystem, implemented at least partially by hardware, configured to determine whether the similarity value is greater or equal to a similarity threshold;
a fourth subsystem, implemented at least partially by hardware, configured to, in response to determining that the similarity value is not greater or equal to the similarity threshold, transmit the second preference data to a third user of a third client device;
a fifth subsystem, implemented at least partially by hardware, configured to, in response to determining that the similarity value is greater or equal to the similarity threshold, perform identifying one or more suggested media items for the second client device based on the comparison; and
a sixth subsystem, implemented at least partially by hardware, configured to perform, responsive to identifying the one or more suggested media items, causing the first client device to send to the second client device playable contents of the one or more suggested media items.

8. The system of claim 7, wherein the first client device and the second client device are different video recording devices.

9. The system of claim 7, wherein the second client device is configured to request to download the one or more suggested media items from the first client device.

10. The system of claim 7, further comprising:
an eighth subsystem, implemented at least partially by hardware, configured to perform determining whether the first client device is similar to the second client device;
wherein the eighth subsystem configured to perform said identifying is configured to do so upon determining that the first client device is similar to the second client device.

11. The system of claim 7, wherein the comparing, identifying, and causing are performed by one or both of the first client device and the second client device.

12. The system of claim 7:
wherein the first client device and the second client device are configured to receive grouping data from a central server identifying client devices in a group of client devices;
wherein the comparing, identifying, and causing are performed in response to determining, based on the grouping data, that the first client device and the second client device are in the group of client devices.

13. One or more non-transitory computer-readable media storing instructions that, when executed by one or more computing devices, cause performance of:
comparing first preference data of a first user of a first client device with second preference data of a second user of a second client device, the first client device and the second client device each being user-operated video devices configured to store and play media contents;
generating a similarity value, based on the comparing of the first preference data with the second preference data, the similarity value indicating a number of common preferences between the first preference data and the second preference data;
determining whether the similarity value is greater or equal to a similarity threshold;
in response to determining that the similarity value is not greater or equal to the similarity threshold, transmitting the second preference data to a third user of a third client device;
in response to determining that the similarity value is greater or equal to the similarity threshold:
identifying one or more suggested media items for the second client device based on the comparison; and
responsive to identifying the one or more suggested media items, causing the first client device to send to the second client device playable contents of the one or more suggested media items.

14. The one or more non-transitory computer-readable media of claim 13, wherein the first client device and the second client device are different video recording devices.

15. The one or more non-transitory computer-readable media of claim 13, wherein the instructions, when executed by the one or more computing devices, further cause performance of the second client device requesting to download the one or more suggested media items from the first client device.

16. The one or more non-transitory computer-readable media of claim 13, wherein the instructions, when executed by the one or more computing devices, further cause performance of:
determining whether the first client device is similar to the second client device;
upon determining that the first client device is similar to the second client device, identifying the one or more suggested media items.

17. The one or more non-transitory computer-readable media of claim 13, wherein the comparing, identifying, and causing are performed by one or both of the first client device and the second client device.

18. The one or more non-transitory computer-readable media of claim 13, wherein the instructions, when executed by the one or more computing devices, further cause performance of:
the first client device and the second client device receiving grouping data from a central server identifying client devices in a group of client devices;
wherein the comparing, identifying, and causing are performed in response to determining, based on the grouping data, that the first client device and the second client device are in the group of client devices.

\* \* \* \* \*